United States Patent
Bonds et al.

(10) Patent No.: US 6,855,257 B2
(45) Date of Patent: Feb. 15, 2005

(54) METHOD AND SYSTEM FOR HEAT TRANSFER

(75) Inventors: Robert Jay Bonds, Des Moines, WA (US); James A. Beshaler, Jr., Tacoma, WA (US); David R. Sizemore, Renton, WA (US)

(73) Assignee: The Boeing Company, Chicago, IL (US)

( * ) Notice: Subject to any disclaimer, the term of this patent is extended or adjusted under 35 U.S.C. 154(b) by 45 days.

(21) Appl. No.: 10/244,949

(22) Filed: Sep. 17, 2002

(65) Prior Publication Data

US 2004/0050792 A1 Mar. 18, 2004

(51) Int. Cl.$^7$ .............................................. B01D 61/00
(52) U.S. Cl. .................... 210/652; 210/651; 210/660; 210/639; 210/175; 210/181; 210/167; 210/195.2
(58) Field of Search ................................ 210/652, 651, 210/660, 639, 175, 181, 167, 195.2

(56) References Cited

U.S. PATENT DOCUMENTS

| | | | |
|---|---|---|---|
| 3,805,880 A | | 4/1974 | Lawler |
| 4,036,749 A | * | 7/1977 | Anderson |
| 4,176,057 A | * | 11/1979 | Wheatley et al. |
| 4,347,704 A | | 9/1982 | Marquardt et al. |
| 4,981,594 A | * | 1/1991 | Jones ........................ 210/634 |
| 5,389,261 A | * | 2/1995 | Daly et al. |
| 5,536,411 A | * | 7/1996 | Blades |
| 5,645,693 A | | 7/1997 | Goede |
| 5,925,255 A | * | 7/1999 | Mukhopadhyay |
| 6,071,413 A | * | 6/2000 | Dyke ........................ 210/651 |
| 6,398,965 B1 | | 6/2002 | Arba et al. |
| 6,402,957 B1 | * | 6/2002 | Boyce |
| 6,461,514 B1 | * | 10/2002 | Al-Samadi |
| 2002/0102182 A1 | | 8/2002 | Suddath et al. |

FOREIGN PATENT DOCUMENTS

| | | |
|---|---|---|
| GB | 784 750 A | 10/1957 |
| WO | WO 01/034443 A | 5/2001 |

* cited by examiner

*Primary Examiner*—Ana Fortuna
(74) *Attorney, Agent, or Firm*—Artz & Artz, P.C.

(57) ABSTRACT

A method and system (10) for utilizing water to transfer heat are provided. In one embodiment, the system (10) includes two water softeners (16) for removing the hardness of the feed water. The water softeners (16) are coupled to a filtration device (14) and deliver the softened water thereto. The filtration device (14) removes minerals from the water so as to produce a filtered water volume and a rejected water volume. The filtration device (14) delivers the filtered water volume to a heat exchanger (12). The heat exchanger (12) evaporates the filtered water volume and produces a mineral deposit volume. The mineral deposit volume is delivered to the filtration device (14) for removal of the mineral deposits so as to produce a recycled water volume and a blowdown water volume. Thereafter, the recycled water volume is delivered to the heat exchanger (12) for reuse, and the blowdown water volume is discharged to the waste vessel (24).

13 Claims, 1 Drawing Sheet

METHOD AND SYSTEM FOR HEAT TRANSFER

TECHNICAL FIELD

The present invention relates generally to heat exchangers that utilize water for transferring heat, and more particularly to a method and system employing a reverse osmosis systems in combination with water softeners for improving heat transfer.

BACKGROUND OF THE INVENTION

Heat exchangers that utilize water for transferring heat are well known. Two examples of these heat exchangers are boilers and cooling towers. As steam is produced by the boiler or as water evaporates from the cooling tower, mineral deposits are typically left behind. Ordinarily, more minerals are introduced by way of the water added to make up for the water lost to steam or evaporation. Eventually, the accumulation of mineral deposits on heat transfer surfaces may reach a level that substantially impedes heat transfer. In addition, the higher concentration of minerals may also result in corrosion of the heat exchanger thereby further decreasing the efficiency of the heat exchanger.

One proposed solution for the accumulation of mineral deposits, e.g. scale build-up, is a process known as blowdown. Blowdown is the process of discharging water saturated with mineral deposits from the heat exchanger. Although this process may successfully decrease the level of mineral deposits within the heat exchanger, it also typically introduces a variety of new problems. One skilled in the art will understand that these problems usually include wasted energy, water, and chemicals used to treat the water. In particular, energy typically is wasted because the discharged blowdown water has the same temperature as that of the steam generated in the boiler. Additionally, water and chemicals are clearly wasted because the discharged blowdown water ordinarily is no longer reused by the heat exchanger.

Another proposed solution utilizes a reverse osmosis system (RO system) for filtering out the undesired mineral deposits from the water and decreasing the volume of heated water and chemicals discharged from the heat exchanger. Ordinarily, the RO system is in operative connection between the heat exchanger and an evaporation pond. As substantial amounts of mineral deposits accumulate within the heat exchanger, the water typically is passed from the heat exchanger to the RO system. The RO system usually removes the mineral deposits and returns a portion of the water to the heat exchanger thereby recycling the heated water. The RO system also typically rejects the mineral deposits with some of the water to an evaporation pond or various other kinds of waste vessels.

A drawback of this proposed solution is that a relatively excessive amount of water still is ultimately discharged from the heat exchanger. In particular, this proposed solution typically recycles only about 75% of the water for reuse by the heat exchanger. The remaining water that is discharged to the evaporation pond still represents a significant portion of water, heat, and chemicals that are wasted, albeit to a lesser degree as compared to the previous proposed solution mentioned above.

Therefore, a need exists for a method and system of heat transfer that recycles a greater portion of the heated water and chemicals for reuse by the heat exchanger.

SUMMARY OF THE INVENTION

The present invention provides a method and system for utilizing water to transfer heat that decreases the amount of water used, as well as costs associated therewith.

The present invention also provides a method and system for utilizing water to transfer heat that decreases the amount of chemicals and biocides used to treat the water, in addition to costs associated therewith.

The present invention further provides a method and system for utilizing water to transfer heat that efficiently retains heat and decreases costs associated with the loss of energy.

In accordance with the present invention, a method and system for utilizing water to transfer heat are provided. In one embodiment, the system includes two water softeners for pretreating the feed water. The water softeners are coupled to a filtration device and deliver the softened water to the filtration device. The filtration device removes minerals from the softened water so as to produce a filtered water volume and a rejected water volume. The filtration device is coupled to a heat exchanger, e.g. a cooling tower, and delivers the filtered water volume to the heat exchanger. The heat exchanger evaporates the filtered water volume and produces a mineral deposit volume. Thereafter, the mineral deposit volume is delivered to the filtration device for removal of the mineral deposits and production of a recycled water volume and a blowdown water volume. The recycled water volume is delivered to the heat exchanger for reuse, and the blowdown water volume is discharged to the waste vessel.

One advantage of the invention is that a substantial portion, e.g. 90%, of the water is recycled thereby reducing the costs associated with supplying the water and discharging the water.

Another advantage of the invention is that a substantial portion, e.g. 90%, of the heated water is recycled thereby preserving heat and energy and increasing the efficiency of the heat exchanger.

Still yet another advantage of the present invention a substantial portion, e.g. 90%, of the treated water is recycled thereby decreasing the amount of chemicals needed to maintain the water at a desirable pH level and decreasing costs associated therewith.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
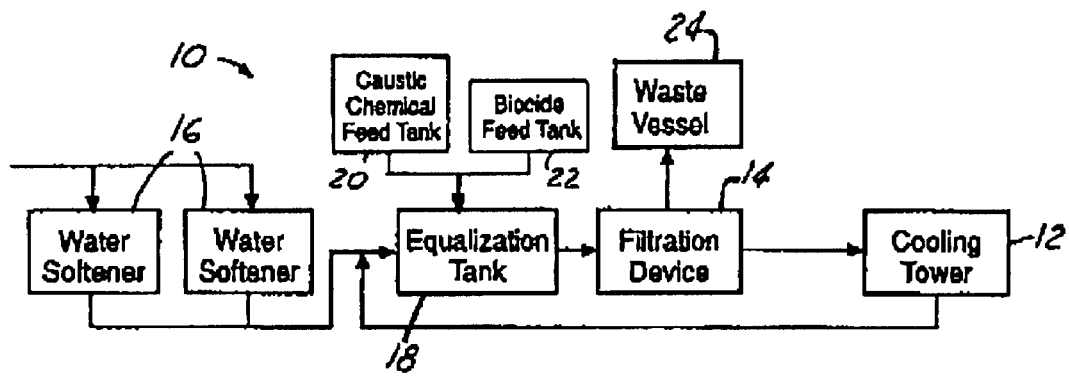
FIG. 1 is a schematic diagram illustrating a system employing a reverse osmosis system and a water softener for improving heat transfer, in accordance with one embodiment of the present invention.

In the following figures the same reference numerals will be used to illustrate the same components in the various views. The present invention is particularly suited for a cooling tower 12. However, it is understood that the present invention may be utilized within a variety of other heat exchangers, such as boilers.

Referring to FIG. 1, there is shown a schematic diagram of a system 10 utilizing a filtration device 14 and a water softener 16 for pre-treating feed water and improving the efficiency of a cooling tower 12. Preferably, the system 10 includes two water softeners 16 for pre-treating the feed water before it is used to transfer heat within the cooling tower 12. However, it is understood that the system 10 may instead include only one water softener 16 or more than two water softeners 16 as desired.

The water softener removes hardness employing ion exchange technology. As one skilled in the art will understand, water softeners remove minerals, e.g. calcium and magnesium, from the water which can otherwise form scale or other deposits as the water evaporates. Pre-treating the water is beneficial because it removes a substantial portion of mineral ions before the water evaporates thereby preventing a considerable amount of scale or other deposits from ever being formed. After extensive ion exchange, the water softener may be regenerated with a brine solution.

Preferably, an equalization tank 18 receives the softened water and stores a desired volume of the water therein. The equalization tank 18 preferably mixes the softened water with an effective amount of caustic chemicals administered from a chemical feed tank 20 or other suitable sources. Examples of suitable caustic chemicals include sodium hydroxide and sulfuric acid. However, it is understood that a variety of other suitable chemicals may be utilized to adjust the pH level of the water.

These chemicals are intended to adjust the pH level of the water for the purpose of decreasing corrosion of the metal in contact with the water. As is known in the art, corrosion is typically defined as the deterioration of a metal by the electrochemical reaction it has with its environment. The benefit of adjusting the pH level of the water is that corrosion is reduced thereby decreasing the deterioration and the possible failure of heat exchanger tubes in the cooling tower 12, as well as maintaining a desirable level of efficiency of the cooling tower 12.

Furthermore, the equalization tank 18 preferably is coupled to a biocide feed tank 22 for receiving a biocide agent therefrom. The biocide agents may be chlorine, bromine, ozone, and a variety of other suitable biocides or microbe growth inhibitors. An effective amount of the biocide agent is injected into the equalization tank and mixed with the water for the benefit of controlling microbiological growth in the warm water. Otherwise, as understood by one skilled in the art, the uncontrolled proliferation of microbes in a cooling tower 12 can result in fouled heat exchangers, corrosion, and clogged filters, screens, or membranes.

A filtration device 14 is coupled to the equalization tank 18 and receives the treated water therefrom. This filtration device 14 preferably is a reverse osmosis system with at least one brackish membrane. However, it is understood that any other suitable filtration device may be utilized.

Preferably, the filtration device 14 removes a substantial portion of the minerals remaining in the water. Removing the minerals produces a rejected water volume and a filtered water volume. The rejected water volume contains the mineral deposits filtered out of the water and is discharged to a waste vessel 24, such as an evaporation pond, sewer line, or various other suitable vessels. In this regard, a person skilled in the art will understand that the filtration device 14 is akin to the water softeners 16 because it further reduces the mineral concentration in the water thereby further decreasing the amount of scale buildup in the cooling tower. Moreover, one skilled in the art will understand that the filtration device 14 may also remove microbiological growth and various other undesired substances from the water.

The cooling tower 12 preferably is coupled to the filtration device 14 for receiving the filtered water volume therefrom. As is known in the art, the cooling tower 12 is employed for transferring heat from a given source to the filtered water. Typically the filtered water is spread over heat transfer surfaces, such as vanes or tubes, and absorbs heat from those surfaces. As the water is distributed in this manner and elevated in temperature, the water may evaporate and leave behind a mineral deposit. As a result of the pre-treatment by the water softeners 16 and the filtration device 14, the water will have a substantially decreased amount of minerals therein and consequently decrease the amount of deposits left behind. In this regard, mineral deposits may accumulate in the cooling tower 12 at a considerably low rate, and the level of mineral deposits within the cooling tower may remain within a desirable range for a relatively long period of time. One skilled in the art will understand that these results increase the efficiency of the cooling tower 12 and decrease its operating costs.

The cooling tower 12 discharges mineral deposit laden water to the filtration device 14 when the level of mineral deposits in the cooling tower 12 ultimately exceeds a desirable level. The filtration device 14 filters the mineral deposits out of the mineral deposit laden water so as to produce a blowdown water volume and a recycled water volume. Similar to the rejected water volume, the blowdown water volume is discharged to the waste vessel 24. Further, the recycled water volume is returned to the cooling tower 12 for reuse in transferring heat. Preferably, the structure of this system 10 can permit approximately 90% recovery of water. As mentioned above, such recovery also leads to conservation of chemicals and energy.

Figure 2:
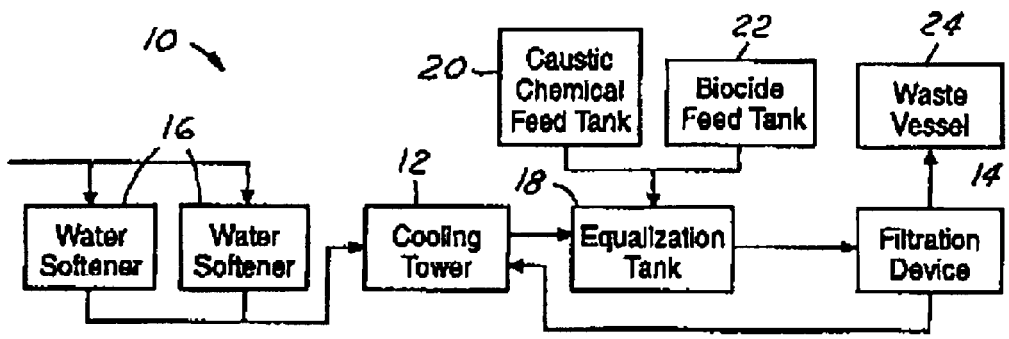
FIG. 2 is a schematic diagram exemplifying another system employing a reverse osmosis system and a water softener for improving heat transfer, in accordance with an alternative embodiment of the present invention.

Referring now to FIG. 2, there is shown an example of another system 10' utilizing water for transferring heat, in accordance with an alternative embodiment of the present invention. Similar to the system 10 described in the preferred embodiment, this system 10' includes one or more water softeners 16. In particular, these water softeners 16 function similarly to those detailed in the preferred embodiment in that they remove the hardness from the feed water.

In contrast to the system 10 detailed in FIG. 1, this system 10' includes a cooling tower 12 that is directly coupled to the water softeners 16. Moreover, the cooling tower 12 continuously recycles the water through an equalization tank 18 and a filtration device 14 regardless of the level of deposits within the cooling tower 12. Although the overall configuration of the alternative embodiment slightly differs from the embodiment of FIG. 1, each individual component, e.g. equalization tank, operates in a similar manner in both embodiments. The configuration of this system 10' can result in a recovery rate of approximately 90%.

Figure 3:
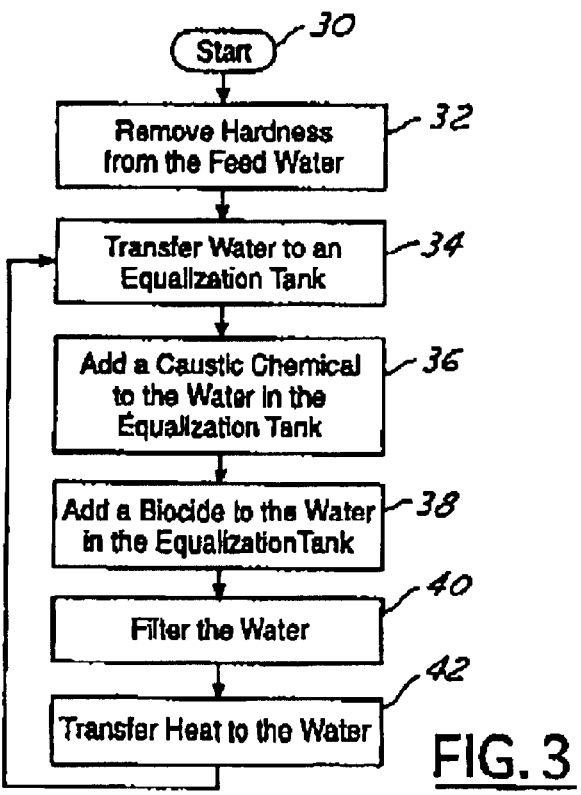
FIG. 3 is a logic flow diagram of one method for utilizing water for the purpose of transferring heat, in accordance with one embodiment of the present invention.

Referring now to FIG. 3, there is shown a flowchart depicting a method for utilizing a filtration device 14 and a water softener 16 for transferring heat, in accordance with one embodiment of the present invention. This method commences in step 30 and then immediately proceeds to step 32.

In step 32, the feed water is processed through one or more water softeners 16 for removing a considerable amount of minerals from the water. This step may be accomplished by employing an automated machine or manually operated by an operator. The water softener preferably is regenerated with a brine solution and alternatively by various other suitable chemicals. After processing through the water softener, the sequence proceeds to step 34.

In step 34, the treated water is delivered to an equalization tank 18 where an effective amount of the softened water is accumulated and stored therein. The amount of water typically depends upon the size of cooling tower, surface area of the heat transfer surfaces, and the amount of heat that will be absorbed by the water. Then, the sequence proceeds to step 36.

In step 36, an effective amount of a caustic chemical is added to the water in the equalization tank. The caustic chemical adjusts the pH level of the water to a desired point for the purpose of decreasing the corrosive nature of the water. As a result, the chemical is beneficial for preserving the longevity and the efficiency of the cooling tower 12. This chemical may be sodium hydroxide, sulfuric acid, or various other suitable chemicals that can adjust the pH level of the water. Further, the amount of this chemical ordinarily depends upon the amount of water in the equalization tank 18 and the existing pH level of the water. Once a sufficient amount of the chemical has been added, the sequence proceeds to step 38.

In step 38, an effective amount of biocide is added to the water in the equalization tank 18. The biocide is intended to control the biological growth in the water so as to reduce corrosion of the metal surfaces, preserve the efficiency of the cooling tower, and decrease fouling of filters, screens, and membranes. Similar to the caustic chemicals, the amount of biocide typically depends upon the amount of water in the equalization tank 18 and the level of microbe proliferation in the water. Preferably, the biocide is ozone. However, the biocide may also be chlorine, bromine, or various other suitable agents for managing the biological growth. After a sufficient amount of biocide has been properly mixed with the water, the sequence proceeds to step 40.

In step 40, the water is transferred from the equalization tank 18 to a filtration device 14 for removing various undesired substances from the water. The filtration device 14 may be an RO system with brackish membranes and alternatively may be various other suitable filtration devices. Typical undesired substances may include remaining minerals and microbes in the water. However, it is understood that a variety of other undesired substances may be filtered out of the water. The filtration device 14 filters the water so as to produce a rejected water volume and a filtered water volume. The rejected water volume preferably is discharged to a sewer line, an evaporation pond, or a variety of other suitable waste vessels. Then, the sequence proceeds to step 42.

In step 42, the filtered water volume is transferred from the filtration device 14 to the cooling tower 12. The cooling tower 12 utilizes the water as a heat sink and usually causes the water to evaporate. As the water evaporates, mineral deposits are typically left behind. Only a relatively small amount of mineral deposits precipitate as a result of pretreating the water with the water softener 16 and the filtration device 14. In this regard, mineral deposits accumulate within the cooling tower 12 at a relatively slow rate thereby decreasing the frequency in which water must be discharged from the cooling tower 12. Decreasing the frequency of discharging water from the cooling tower 12 increases the efficiency of the cooling tower 12 and costs associated with its operation.

Once an undesired level of mineral deposits has ultimately accumulated in the cooling tower, steps 34 through 42 are repeated. In particular, an effective amount of mineral deposit laden water is transferred from the cooling tower 12 to the equalization tank 18 thereby starting the sequence over again from step 34 on. Repetition of these steps recycles a substantial portion of the water, e.g. 87–90%, and allows for a relatively small amount of blowdown water to be discharged to the waste vessel 24. Also, less make-up water is required to replace the evaporated water, and less chemicals and biocides are required to replace those discharged with the blowdown water to the waste vessel 24.

While particular embodiments of the invention have been shown and described, numerous variations and alternate embodiments will occur to those skilled in the art. Accordingly, it is intended that the invention be limited only in terms of the appended claims.

What is claimed is:

1. A system that uses feed water for transferring heat, comprising:
   at least one water softener for softening feed water;
   an equalization tank connected to said water softener to receive softened water and obtain a desired pH level of the softened water;
   a biocide feed tank containing biocide for decreasing a biological growth in the softened water, couple to said equalization tank
   a filtration device receiving water from the equalization tank, said filtration device removing a plurality of minerals from the water and producing a filtered water volume and a rejected water volume, said rejected water volume is discharged to a waste vessel connected to the filtration device;
   a heat exchanger couple to said filtration device and receiving said filtered water volume, said heat exchanger producing a mineral deposit laden water volume, a conduit for delivering the deposit laden water volume to the equalization tank, and further to said filtration device to produce a recyled water volume and a blowdown water volume;
   said recyled water volume is delivered to said heat exchanger, and the blowdawn water volume is delivered to said waste vessel.

2. The system of claim 1 wherein said filtration device is a reverse osmosis system.

3. The system of claim 2 wherein said reverse osmosis system includes at least one brackish membrane.

4. The system recited in claim 1 wherein said at least one water softener comprises a first water softener and a second water softener.

5. The system recited in claim 1 wherein said at least one water softener includes a brine solution for regenerating said at least one water softener.

6. A system that uses water or transferring heat, comprising:
   at least one water softener for softening feed water;
   a heat exchanger receiving the softened water from said at least one water softener, said heat exchanger producing a mineral deposit laden water volume;
   an equalization tank connected to said heat exchanger to receive said mineral deposit laden water and, said equalization tank employed for obtaining a desired pH level of the water;
   a filtration device coupled to said equalization tank and receiving said pH adjusted mineral deposit laden water volume therefrom, said filtration device for removing a plurality of minerals from said mineral deposit laden water volume and producing a filtered water volume and a rejected water volume, said filtration device is coupled to said heat exchanger to deliver said filtered water volume to said heat exchanger, said rejected water volume is discharged to a waste vessel;

Wherein a biocide feed tank is coupled to said equalization tank for supplying said equalization tank with a biocide for decreasing a biological growth in the mineral deposit laden water volume.

7. The system recited in claim 6 wherein said filtration device is a reverse osmosis system.

8. The system recited in claim 7 wherein said reverse osmosis system includes at least one brackish membrane.

9. The system of claim 6 wherein said equalization tank is coupled to at least one of a chemical feed tank and a biocide feed tank, said chemical feed tank for supplying said equalization tank with a caustic chemical for obtaining said desired pH level of the water, said biocide feed tank for supplying said equalization tank with a biocide for controlling biological growth in the water.

10. The system recited in claim 6 wherein said at least one water softener comprises a first water softener and a second water softener.

11. A method for using feed water to transfer heat, comprising:

softening feed water;

accumulating the softened water in an equalization tank;

reducing biological growth within the softened water in said equalization tank;

adjusting the pH of the softened water in said equalization tank;

filtering the pH adjusted softened water with a reverse osmosis filtration system;

delivering said filtered water to a heat exchanger;

evaporating a first portion of the filtered water within said heat exchanger;

accumulating a plurality of minerals in a second portion of the filtered water that is in liquid form within said heat exchanger producing a mineral deposit laden water;

delivering the mineral deposit laden water to said equalization tank; and re-filtering the water in said reverse osmosis system;

rejecting a mineral deposit, and producing a filtrate, and directing the filtrated back to the heat exchanger;

directing the rejected mineral deposit to a waste vessel.

12. The method as recited in claim 11 wherein at least one of said filtering the softened water and said re-filtering the water comprises passing the water through a brackish membrane of a reverse osmosis system.

13. The method as recited in claim 11 wherein softening the water comprises adding brine for regenerating at least one water softener.

* * * * *